United States Patent [19]

Ogawa et al.

[11] Patent Number: 4,716,530
[45] Date of Patent: Dec. 29, 1987

[54] SYSTEM FOR AUTOMATICALLY CONTROLLING MOVEMENT OF UNMANNED VEHICLE AND METHOD THEREFOR

[75] Inventors: Hiroshi Ogawa; Yasuyuki Miyazaki, both of Aichi; Susumu Yoshida, Kakamigahara; Shinichi Sasaki, Nagoya, all of Japan

[73] Assignee: Kabushiki Kaisha Meidensha, Tokyo, Japan

[21] Appl. No.: 704,522

[22] Filed: Feb. 22, 1985

[30] Foreign Application Priority Data

May 21, 1984 [JP] Japan .................................. 59-74140
May 21, 1984 [JP] Japan .................................. 59-74145
Jul. 9, 1984 [JP] Japan .................................. 59-142037

[51] Int. Cl.$^4$ ............................................. G06F 15/50
[52] U.S. Cl. ................................... 364/424; 180/168; 318/587
[58] Field of Search ........... 364/424, 443, 449, 431.04; 180/167, 168, 169; 318/587; 340/52 F

[56] References Cited

U.S. PATENT DOCUMENTS

| | | | |
|---|---|---|---|
| 3,245,493 | 4/1966 | Barrett, Jr. .......................... | 180/168 |
| 4,003,445 | 1/1977 | DeBruine ............................ | 318/587 |
| 4,049,961 | 9/1977 | Marcy ................................. | 180/169 |
| 4,278,142 | 7/1981 | Kono .................................... | 180/168 |
| 4,284,160 | 8/1981 | Deliban et al. ..................... | 180/168 |
| 4,361,202 | 11/1982 | Minovitch .......................... | 180/168 |
| 4,401,181 | 8/1983 | Schwarz ............................. | 180/168 |
| 4,497,057 | 1/1985 | Kato et al. ......................... | 364/431.04 |
| 4,530,056 | 7/1985 | MacKinnon et al. ............... | 318/587 |
| 4,534,214 | 8/1985 | Takahashi .......................... | 340/52 F |
| 4,566,032 | 1/1986 | Hirooka et al. .................... | 364/424 |

Primary Examiner—Gary Chin
Attorney, Agent, or Firm—Schwartz, Jeffery, Schwaab, Mack, Blumenthal & Evans

[57] ABSTRACT

A system for automatically controlling movement of an unmanned vehicle and method therefor wherein one or more than one marker is installed between each branched corner formed by a guide road through which the vehicle passes for providing an indicating means for the vehicle to accelerate, decelerate, or turn the branched corner and the vehicle includes detecting means for detecting the presence of the marker and outputting a signal indicating that the marker is located at the corresponding position and a controller in which data and main program on a pattern of turning the movement of the vehicle at any given branched corner and vehicle speed control according to the detected number of markers in accordance with a route of movement from a starting point which is loaded prior to the start of the vehicle so that the control for turning the movement direction of the vehicle and vehicle speed is carried out by fetching the corresponding above-described data and main program of the pattern according to the number of detected markers. Furthermore, at least one timer is provided in the controller which outputs an interrupt signal so that an interrupt program is executed for controlling an on-and-off period of steering and/or movement motor chopper circuit with the main program being temporarily halted.

18 Claims, 9 Drawing Figures

SYSTEM FOR AUTOMATICALLY CONTROLLING MOVEMENT OF UNMANNED VEHICLE AND METHOD THEREFOR

BACKGROUND OF THE INVENTION

The present invention relates generally to a system for automatically controlling movement of an unmanned vehicle and method therefor, particularly applicable to an unmanned transportation system in a factory or warehouse.

Recently, a great many unmanned vehicles have been produced which follow prearranged orbits or guide paths built into the floor, for example in factories or warehouses, in order to automatically transport loads. Since the steering is controlled in accordance with prearranged programs, changes in the vehicle course can be made only by modifying the programs. In addition, the intervals of acceleration or deceleration of such vehicles are determined by the driving torque of a motor serving as the prime mover. Since the driving torque is also controlled in accordance with the prearranged programs, the acceleration control can be altered only by changing the program.

A communication terminal comprising, e.g., a radio transceiver or opto-electrical communications equipment is provided at each point along the track at which such unmanned vehicles may change direction, accelerate, decelerate, or stop. In addition, a general control computer (also called host computer) located at an operation center uses these communication terminals to issue various commands to each vehicle to carry out steering adjustments, accelerate or decelerate the vehicle, or stop the vehicle using an identification code for each vehicle. A controller installed on each vehicle carries out the course corrections or speed adjustments (acceleration, deceleration or stop) in accordance with the commands issued by the general control computer.

Although it is possible to control the movements of a plurality of such unmanned vehicles along a plurality of routes in the above-described conventional system since commands can be issued arbitrarily to each vehicle by means of the individual identification codes, the communication equipment located on the ground and on the vehicles and the controllers installed on the vehicles is exceedingly complex and expensive. In addition, there are various problems in the above-described control method. Particularly when the routes followed by the vehicles are to be changed or expanded, large-scale construction including installation and/or movement of communication equipment on the ground, program modification and expansion of the processing capacity of the controllers installed on the vehicles are required. The communication between the vehicles and general control computer is rather complex so that reliability cannot be assured even when special communications hardware is employed.

SUMMARY OF THE INVENTION

With the above-described problem in mind, it is an object of the present invention to provide a system and method for automatically controlling movement of an unmanned vehicle which solves the above-described problems, wherein one or more markers installed at or before each branch point or curve of a guide road through which the vehicle passes instruct the vehicle to accelerate, decelerate, or change direction and the vehicle includes detecting means for detecting and outputting a signal indicating the presence of a marker and a controller using data defining a pattern of control of vehicle direction and vehicle speed at any given point along the guide road according to the detected number of markers causes the vehicle to follow the guide road in accordance with a predetermined route specified by the pattern. The pattern data includes a series of instructions concerning control of vehicle speed and direction, and the series is followed by fetching the next instruction data each time a marker is detected.

In addition, the controller includes a microcomputer including at least one timer, which is given a timing or duty cycle (CPU) during execution of the above-described control based on the loaded data so that an interrupt program is executed which determines the on or off duration of either or both of two chopper circuits for controlling the vehicle speed and steering movement via the respective motors.

BRIEF DESCRIPTION OF THE DRAWINGS

A more complete understanding of the present invention may be obtained from the following description in conjunction with the accompanied drawings in which like numerals designate corresponding elements and in which.

DETAILED DESCRIPTION OF THE PREFERRED EMBODIMENTS

Reference will hereinafter be made to the drawings in order to facilitate understanding of the present invention.

Figure 1A:
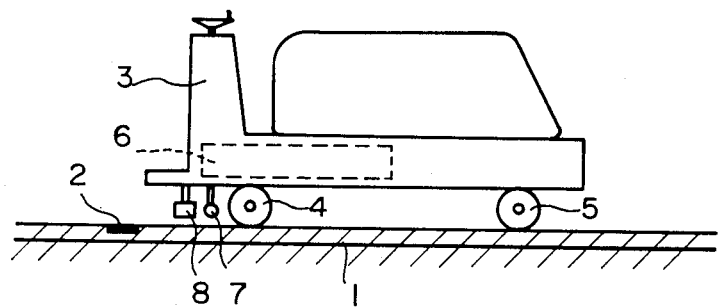
FIG. 1(A) is a diagram of the an unmanned vehicle and track on which sensors and a vehicle controller according to the present invention are mounted.

FIG. 1(A) illustrates the relationship between a marker and an unmanned vehicle according to the present invention.

As shown in FIG. 1(A), a guide wire 1 extends across the floor of, for example, a factory at a certain depth underground so as to guide the vehicle therealong.

Figure 2:
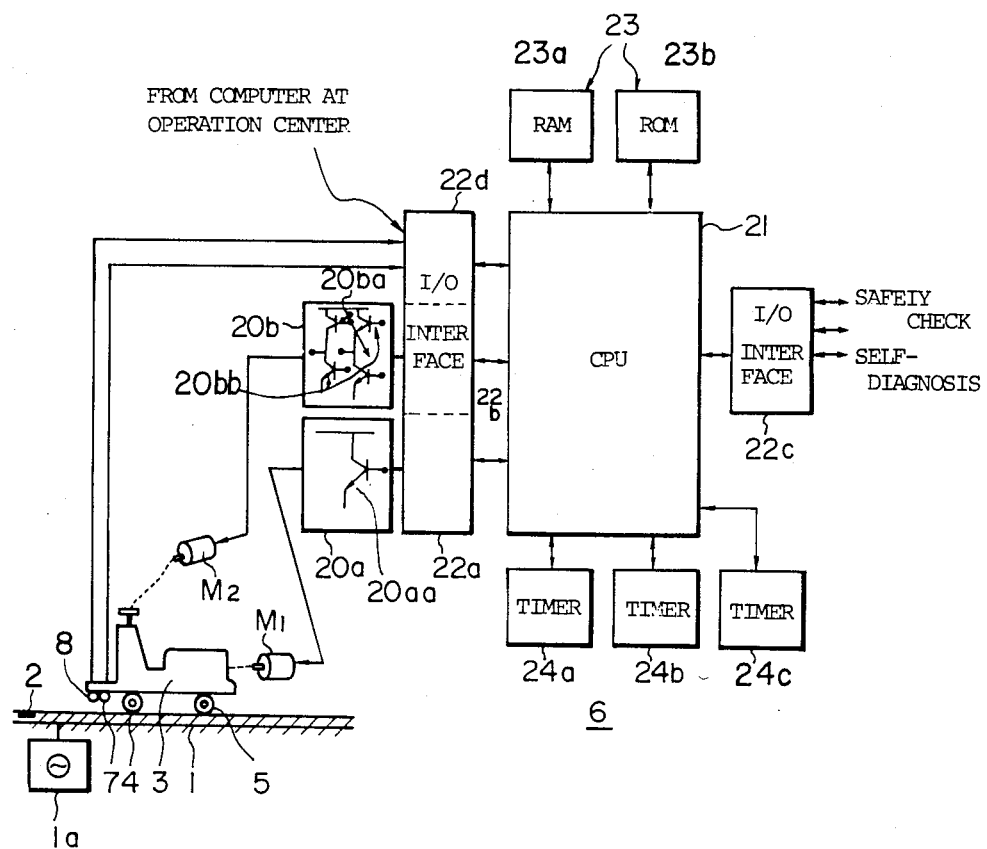
FIG. 2 is a simplified internal circuit block diagram of the controller shown in FIG. 1(A)

Fixed-frequency AC from a generator 1a shown in FIG. 2 flows through the guide wire 1. In addition, FIG. 1(a) includes a typical marker 2 installed on the floor near the guide wire 1. An unmanned vehicle 3 is provided with a controller 6 including a microcomputer which controls, a steering operation unit (to be described later) orienting front wheels 4 so as to determine the steering direction of the vehicle 3, and a driving (to be described later) unit driving the rear wheels 5 so as to determine the speed of the vehicle 3. In addition, the vehicle 3 is provided with a movement direction sensor 7, which monitors the intensity of the magnetic field generated by the alternating current flowing through the guide wire 1 and outputs an electrical signal whose level is proportional to the deviation of the vehicle from the guide wire 1, as well as a marker sensor 8 for detecting the presence of a marker 2 and outputting an electrical signal indicating the presence of a marker 2. The structure of the movement direction sensor 7 is exemplified by the system disclosed in Japanese Patent Application Unexamined Open Nos. Sho 53-45999 and Sho 50-131220.

The output electrical signals from the above-described sensors 7, 8 are converted into corresponding digital signals and inputted into the microcomputer of the controller 6 as data for use in determining direction and speed. The marker 2 may be an optical marker which emits an optical output such as infrared rays vertically, in which case the marker sensor 8 would be a light-receiving element which outputs an electrical signal upon receipt of infrared rays from the marker 2 and an amplifier which amplifies the transduced signal from the light-receiving element. Alternatively, the marker sensor 8 and marker 2 may comprise a well-known position detection arrangement discussed in Japanese Patent Application Unexamined Open No. Sho 57-162003.

Figure 1B:
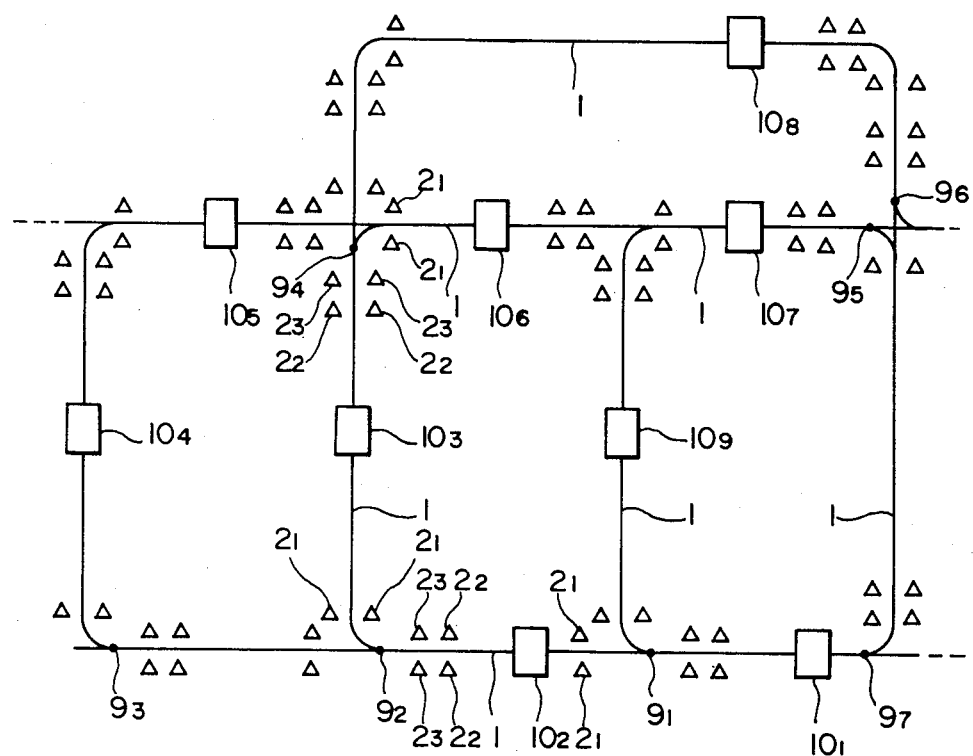
FIG. 1(B) shows an exemplary arrangement of an unmanned vehicle course defined by guide wires installed on the ground, a plurality of markers shown in FIG. 1(A) and work stations.

FIG. 1(B) shows an example of the arrangement of markers 2 and stations 10 about the factory according to the present invention.

In FIG. 1(B), each symbol Δ denotes a marker 2. Each marker 2 is located near the guide wire 1 as described above so as to enable the marker sensor 8 to detect the presence of the marker 2 as the vehicle passes. As appreciated from FIG. 1(B), three markers 2, i.e., $2_1$, $2_2$ and $2_3$ are arranged in sequence around each branch point denoted by $9_1$ through $9_6$ and around every corner. One of the three markers 2 denoted by $2_1$ in FIG. 1(B) is installed at the exit point of the curve of each branching line. This marker $2_1$ marks the point at which the vehicle 3 may start to accelerate since the vehicle has exitted a curve and entered a straight away. Another one of the three markers 2 denoted by $2_2$ in FIG. 1(B) installed well before each curve at a point at which the vehicle 3 should start to decelerate since the vehicle 3 will soon enter the next curve, provided that the vehicle is either changing direction or going around a corner.

The remaining marker denoted by $2_3$ in FIG. 1(B) is installed at a point just in front of the next curve and beyond the above-described marker $2_2$. The markers $2_3$ mark the points at which the vehicle 3 should start to adjust its steering as it enters a curve.

It should be noted that although in the embodiment shown in FIG. 1(B) three markers $2_1$, $2_2$, $2_3$ are installed around each curve and branch point, such markers may also be installed at working stations $10_1$ through $10_9$ at which the vehicle 3 starts or stops and the number of such markers may be increased or decreased according to necessity. The number of such markers can be determined according to the nature of the overall system. For example, in a system in which only one marker is installed along the guide wire 1 in front of each branch point, the vehicle 3 is driven so as to maintain the vehicle speed at a constant (, i.e., neither accleration nor deceleration is performed) upon detection of a marker. In another approach, one of two markers may be installed at each of the stations $10_1$ through $10_9$ at which the vehicle 3 may stop and the other marker may be installed at a point just in front of curve or each branch point. Furthermore, it is also possible to install a plurality of markers 2 along the guide wire 1 at regular intervals in order to achieve highly precise control of movement of the vehicles.

As shown in FIG. 1(B), markers 2 are installed symmetrically on both sides of the guide wire 1 and marker sensors 8 of the vehicles 3 are so constructed as to enable detection of signals originating from the marker on either side so that the presence of a marker can be recognized even if the marker on one side of the guide wire 1 malfunctions.

FIG. 2 shows the configuration of the above-described controller 6 built into each vehicle 3.

The controller 6 as illustrated in FIG. 2 comprises: (a) a first chopper circuit 20a controlling the output torque of a first motor $M_1$; (b) a second chopper circuit 20b controlling the output torque of a second motor $M_2$; (c) a Central Processing Unit (CPU) 21 of the microcomputer, the function of which will be described later; (d) Input/Output (I/O) interfaces 22a, 22b, 22c, 22d; (e) memory 23 including RAM 23a and ROM 23b; and (f) a pair of timers 24a, 24b connected to the CPU 21. The first chopper circuit 20a includes a first chopper transistor 20aa for controlling the current flow through the first motor $M_1$ according to the duty cycle of an on-and-off signal applied thereto to its base electrode in series with, and a main switch (not shown) connected across the first chopper transistor 20aa and in series with the shunt resistor. Supply current from a battery (not shown) is supplied to the first motor $M_1$ either fractionally via the chopper transistor 20aa and the resistor or directly via the main switch and the resistor whereby the maximum torque is generated by the first motor $M_1$ when the main switch is closed. The first motor $M_1$ comprises a reversible DC motor whose rotational direction is changed by changing the direction of the voltage applied to the field winding of the first motor $M_1$ in accordance with a command issued by the CPU 21. The first motor $M_1$ drives the vehicle 3 in the forward or rearward direction.

The second chopper circuit 20b includes two pairs of second chopper transistors 20ba, 20bb connected in a polarity cross. That is, two parallel legs of two serially connected transistors each are connected between the power supply and a grounded shunt resistor. The reversible second motor $M_2$ is connected pairs of transistors, which are arranged 20ba-20bb and 20bb-20ba. The transistors sharing a label also share the same base bias signal from the controller 6. Thus, the rotational direction of the second motor $M_2$ depends on which two chopper transistors 20ba or 20bb connected in a cross relationship is currently conductive. The steering wheel of the vehicle 3 is connected to the second motor $M_2$ so that the steering direction of the vehicle 3 is controlled by the second motor $M_2$.

It should be noted that the above-described marker sensor 8 and movement direction sensor 7 are connected to the CPU 21 via an I/O interface 22d. In addition, the CPU 21 also receives instructions from a general computer (not shown) located at an operation center of the factory via communication terminal to be described later The CPU 21, operating in accordance with a main program and an interrupt program stored in the memory 23, performs on-and-off control of the above-described first chopper transistor 20aa and second chopper transistors 20ba, 20bb of the first and second chopper circuits 20a, 20b, respectively and performs a vehicle safety check and a self-diagnosis via the I/O interface 22c. The safety check includes a check on the voltage of the vehicle battery for biasing the entire controller 6 to a predetermined voltage, a check for whether overvoltages are applied to either first or second motors $M_1$ or $M_2$, a check for whether overcurrents flow through either first or second chopper circuits 20a, 20b, and so on. The contents of the self-diagnostic check include checks for whether the memory 23 is connected properly to the CPU 21 and whether the sensors 7, 8 are functioning normally. These check operations (carried out during initialization) are carried out prior to starting of the vehicle 3.

Each of the timers 24a, 24b outputs an interrupt signal to the CPU 21 after a set time (operation interval) has elapsed. The CPU 21 starts to execute the interrupt program after first interrupting execution of the main program in response to the interrupt signal. The main program includes the initialization routine, a vehicle speed control routine and a vehicle direction control routine to be described later.

The initialization routine includes the above-described safety check and self-diagnosis operations. The vehicle speed control routine and direction control routine includes steps for generating a control signal for the first chopper transistor 20aa and the second chopper transistors 20ba, 20bb in accordance with instructions stored in the memory 23. It should be noted that since the interval for which each of the first and second chopper circuits 20a, 20b is turned on and off are predetermined constants depending on the capacity of each transistor 20aa, 20ba, the on-interval of each of the first and second chopper circuits 20a, 20b is calculated in the interrupt program by multiplying the predetermined period by a preset duty ratio in the main program.

Figure 3:
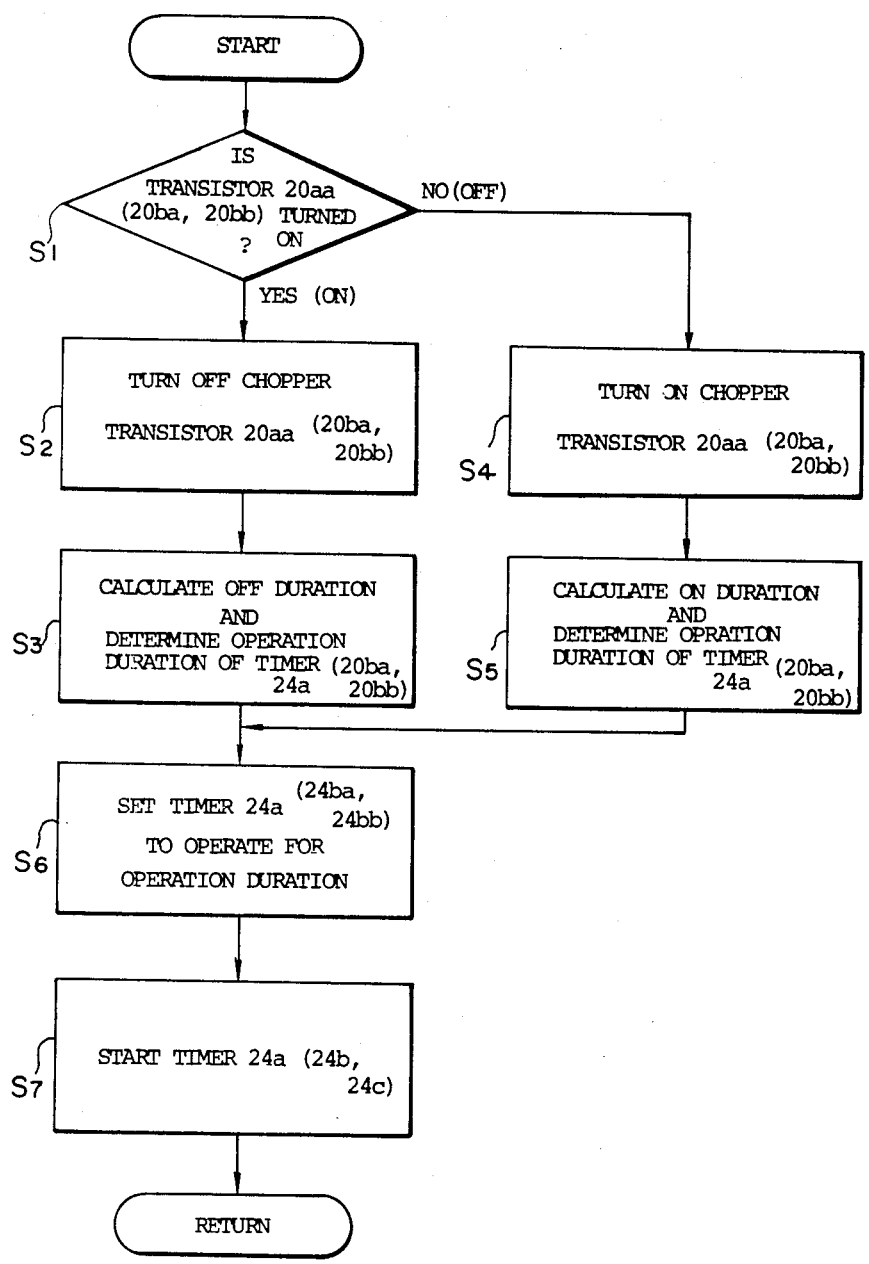
FIG. 3 is a processing flowchart of an interrupt program executed by the controller shown in FIG. 2.

FIG. 3 is a flowchart of one interrupt program routine executed by the CPU in response to an interrupt signal from, e.g., one of the three timers 24a, 24b, 24c. In practice, three interrupt routines will handle the power supply to the transistors 20aa, 20ba, and 20bb respectively in response to signals from corresponding timers 24a, 24b, 24c.

When an interrupt signal is received, the CPU 21 executes a step $S_1$ for determining whether the above-described first chopper transistor 20aa is currently conductive (on). If the CPU 21 determines that the first chopper transistor 20aa is currently turned on, the CPU 21 executes a step $S_2$ in which the CPU 21 issues on OFF command to the first chopper transistor 20aa, whereby it is deactivated. Next, in a step $S_3$ the CPU 21 calculates the desired off-duration of the first chopper transistor 20aa by subtracting the on-duration specified by the main program, as explained later, from the predetermined on-and-off period and sets the calculated off-duration as the current operation duration of the timer 24a.

On the other hand, if the CPU 21 determines at step $S_1$ that the first chopper transistor 20aa is currently turned off, the CPU 21 executes a step $S_4$ in which the first chopper transistor 20aa is turned on. Next, in a step $S_5$ the CPU 21 determines the on-duration of the first chopper transistor 20aa similarly to as described with respect to step $S_3$.

In a step $S_6$ following step $S_3$ or $S_5$, the CPU 21 sets the timer 24a to the operation duration determined in either step $S_3$ or $S_5$ and in the next step $S_7$, the CPU 21 starts the timer 24a. After the interrupt routine is completed, control returns to the main program.

The controller 6 performs control over the vehicle speed and direction in accordance with the above-described main and interrupt program and with the sensor signals, particularly the presence of markers 2 along the guide wire 1. That is to say, the controller 6 is previously loaded with data (the data used in this specification includes main and interrupt programs and data on the duty ratio and so on) specifying a predetermined pattern of vehicle speed and direction from a starting point to a final destination via a predetermined route. Furthermore, the controller 6 performs control over the transport of at least one load to the final destination and controls the vehicle speed and direction during movement along another return route from the final destination back to the starting point in accordance with other data previously loaded prior to start.

For example, in the case where the starting point is the station $10_2$, the route of movement is station $10_2$ - branch $9_2$ - station $10_3$ - branch $9_4$ - station $10_6$ (final destination), and the return route is station $10_6$ - station $10_7$ - branch $9_5$ - station $10_1$ - branch $9_1$ - and station $10_2$(initial starting point) (refer to FIG. 1(B)), the ROM 23b of the microcomputer will be preloaded with all of the necessary instructions and values in a predetermined memory area. Specifically, the data stored in the memory will include a start instruction to start the vehicle 3 at the station $10_2$; a decelerate instruction to decelerate the vehicle 3 when the first marker $2_2$ is detected; steering adjustment instruction to turn the vehicle 3 to the right at the branch $9_2$ when the next marker $2_3$ is detected; an accelerate instruction to accelerate the vehicle 3 when the third marker $2_3$ is detected; a decelerate instruction to decelerate the vehicle 3 again after the vehicle 3 reaches the station $10_3$ and passes through the subsequent marker $2_2$; another steering adjustment instruction to turn the vehicle to the right at the branch $9_4$ when the subsequent marker $2_3$ is detected; an accelerate instruction to accelerate the vehicle 3 when the subsequent marker $2_1$ is detected; and finally, a stop instruction to stop the vehicle 3 when the vehicle reaches the station $10_6$. Similar data are stored in the ROM 23b for the return route.

Figure 4:
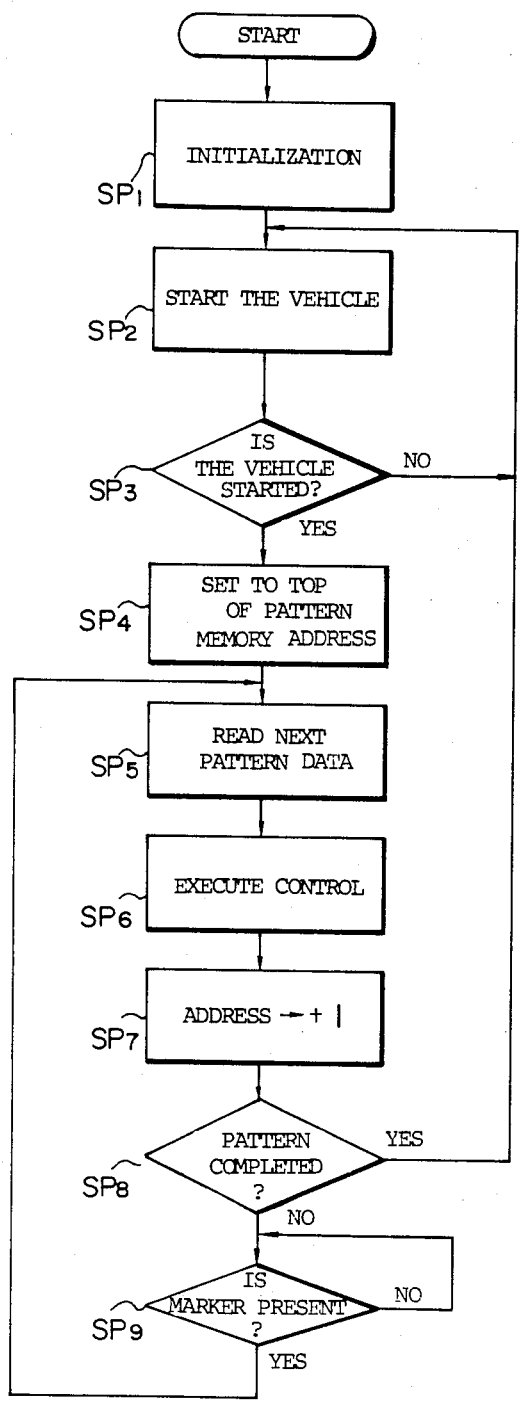
FIG. 4 is a flowchart of a general program executed by the controller shown in FIG. 2 in accordance with previously stored data representing a predetermined pattern of vehicle speed and direction from a starting point to a final destination via a predetermined route.

FIG. 4 is a flowchart of a main program which the controller 6 executes to control movement of the vehicle on the basis of the data stored in the memory 23.

In a first step SP1, the CPU 21 executes the above-described initialization routine prior to starting the vehicle 3. After the CPU 21 receives a start instruction from the general control (host) computer at the operation center via the I/O interface 22d shown in FIG. 2, the CPU 21 fetches a first start instruction from the predetermined memory area holding the above-described data and issues a start command to the vehicle speed control unit, i.e., first chopper circuit 20a in a step SP2 to start the vehicle 3. Next, in a step SP3, the CPU 21 determines whether the vehicle 3 has started. Since the vehicle 3 always starts at specified one of the stations $10_1$ through $10_9$ in the step SP2 by the start command, the CPU 21 transfers the data specifying a previously selected pattern of movement from the starting station to the destination station to the predetermined memory area of the memory 23, i.e., to RAM (Random Access Memory) 23a from ROM (Read-Only Memory) 23b in a step SP4 via a step SP3.

In the next step SP5, the CPU 21 reads a head address of the predetermined memory area of the memory 23 in which all of the data after the start instruction is stored. If the contents of the head address is the accelerate instruction in a step SP5, the CPU 21 generates an accelerate command in step SP6 and outputs it to the first chopper circuit 20a to accelerate the vehicle 3 via the first motor $M_1$ shown in FIG. 2. The accelerate command includes the duty cycle information for the first chopper transistor 20aa.

In a step SP7, the CPU 21 increments the current address within the predetermined memory area by one. In a step SP8, the CPU 21 determines whether the instruction in the newly incremented address indicates the end of this pattern of movement. If the CPU 21 determines that the incremented address does not represent the end of pattern of movement, then from the step SP8, the routine goes to a step SP9 wherein the CPU 21 waits for the detection signal from the marker sensor 8 indicating the presence of a marker.

After the CPU 21 receives the detection signal from the marker sensor 8 in the step SP9, steps SP5–SP8 are repeated. This loop SP5–SP9 continues until the vehicle 3 reaches and stops at its final station. Since the incremented address will finally command the end of the predetermined pattern of movement, the routine goes from the step SP8 to the step SP2 to wait for the next instruction to start the vehicle 3 from the general control computer at the operation center. Thereafter, the controller 6 selects a complementary pattern which returns the vehicle 3 to its initial starting station. In this way, since the number of the detected markers corresponds to the number of addresses of the predetermined memory area, proper control of the vehicle speed and direction can be achieved at every marker so that the vehicle 3 can securely reach its destination along the predetermined route.

As described above, the CPU 21 controls vehicle speed and direction according to the contents of the fetched instruction stored in the predetermined area of the memory 23. For example, if the steering adjustment instruction is fetched, the CPU 21 derives a new value for the duty cycle for one set of second chopper circuit elements 20ba, 20bb according to the desired, preprogrammed steering adjustment. Similarly, the CPU 21 sets the duty cycle of the first chopper transistor 20aa when vehicle speed is to be adjusted.

Figure 5:
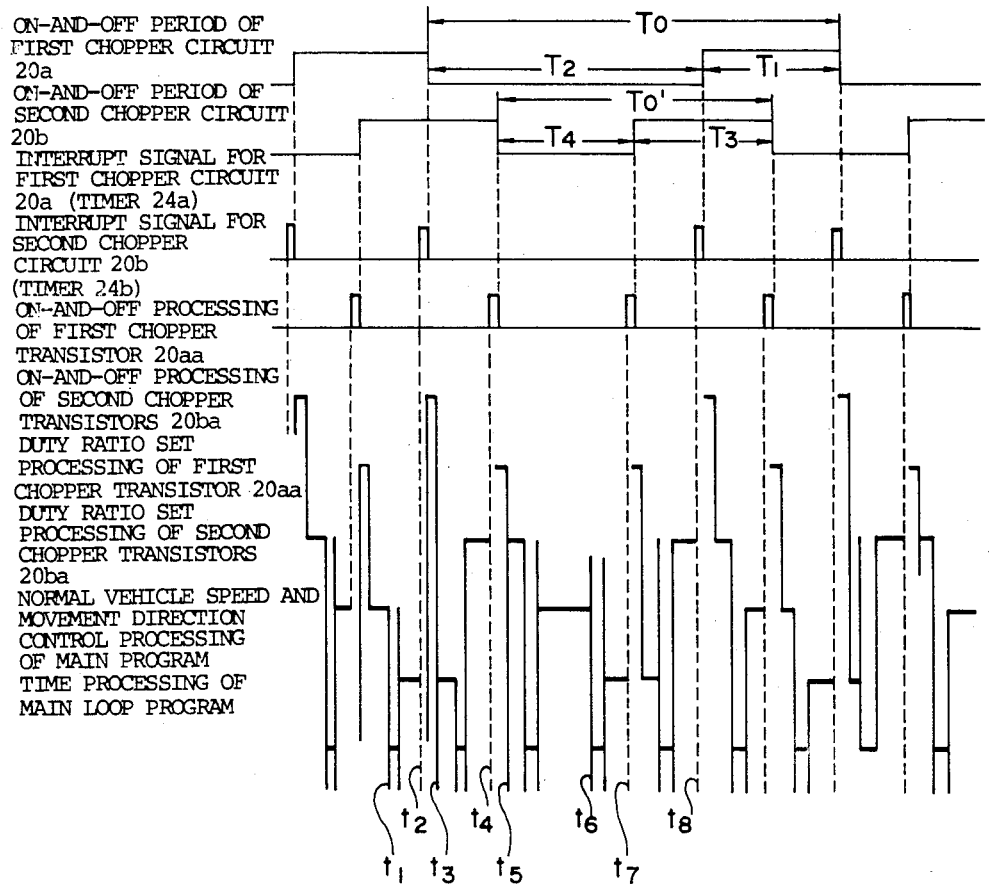
FIG. 5 is an exemplary timing chart of a Central Processing Unit (CPU) of the controller during processing of the previously stored data mediated by the main program and interrupt program shown in FIGS. 3 and 4.

FIG. 5 illustrates the timing of the various control processes. This timing chart is simplified to some extent by omitting signals related to the second chopper transistors 20bb which will be processed in the same manner as, but at different times than, the complementary transistors 20ba.

Suppose that currently the on-duration of the first chopper transistor 20aa is set to $T_1$, the on duration of the required second chopper transistor 20ba is set to $T_3$, and the derivation of the duty cycle of the second chopper transistors 20ba ends at time $t_1$ in FIG. 5. Thereafter, a time processing for the main loop program is carried out and such a normal processing of vehicle movement control as shown in FIG. 4 is started. When the time $t_2$ has been reached, the timer 24 outputs the interrupt signal to the CPU 21. The CPU 21 then temporarily halts the above-described normal processing of the control of vehicle speed and movement direction and in turn executes an on-and-off processing of the first chopper transistor 20aa. That is to say, since at this time the first chopper transistor 20aa is turned on as seen from FIG. 5, the CPU 21 issues an OFF command to turn off the first chopper transistor 20aa via the I/O interface 22a. Thereafter, as described in the step $S_3$ of FIG. 3, the off duration $T_2$ is calculated by the subtraction of the on duration $T_1$ from the predetermined period $T_0$ and is determined as the operation duration of the timer 24a. The CPU 21 then sets the timer 24a to operate until the operation duration $T_2$ calculated as described above has been reached. Therefore, the subsequent interrupt signal is outputted from the timer 24a at the time $t_8$, i.e., at the time when the operation duration $T_2$ has elapsed. In this way, upon completion of the on-and-off processing of the first chopper transistor 20aa, the normal processing of vehicle speed and movement direction control, currently halted, is restarted. After this normal processing is ended, the set processing of the duty ratio for the first chopper transistor 20aa is started via the time processing of the main loop program. Thereafter, the interrupt signal is outputted from the timer 24b at the time $t_4$ to the CPU 21. At this time, the CPU 21 temporarily halts the above-described set processing of the duty ratio for the first chopper transistor 20aa and in turn executes the on-and-off processing of the second chopper transistor group 20ba. Since at this time the second chopper transistor group 20ba is turned on at the time $t_4$ as seen from FIG. 5, the CPU 21 issues an OFF command to turn off the corresponding second chopper transistors 20ba. Thereafter, the off duration $T_4$ of the corresponding second chopper transistors 20ba is calculated by the subtraction of the on duration $T_3$ from the predetermined period $T_0'$ for the second chopper transistor group 20ba and is determined as the operation duration of the timer 24b. Therefore, the CPU 21 sets the timer 24b to operate until the operation duration $T_4$ has been reached. The subsequent interrupt signal is outputted from the timer 24b to the CPU 21 at the time $t_7$ as shown in FIG. 5, i.e., when the operation duration $T_4$ has elapsed. In this way, when the on-and-off processing described above of the second chopper transistor group 20ba is ended at the time $t_5$, the normal main program of the control is restarted, i.e., the set processing of the duty ratio of the first chopper transistor 20aa is restarted as appreciated from FIG. 5. When the above-described set processing is ended, the CPU 21 executes the set processing of the duty ratio of the second chopper transistors 20ba until the time $t_6$ has reached. At the time $t_6$, the CPU 21 executes the time processing of the main loop program routine and thereafter executes the normal processing of the vehicle speed and movement direction control. During the processing of the above-described normal processing of control, the interrupt signal is outputted from the timer 24b to the CPU 21 at the time $t_7$. At this time, the CPU 21 executes the interrupt processing such that the on-and-off control of the second chopper transistor group is carried out. Since at this time the second chopper transistor group 20ba is turned off as appreciated from FIG. 5, the CPU 21 issues an ON command to turn on the second chopper transistor group 20ba. Thereafter, the CPU 21 sets the timer 24b to operate during the on duration $T_3$ set in the step $S_5$ of FIG. 3. Thereafter the temporarily halted normal processing of control is restarted and time processing of the main loop program routine is carried out. Furthermore, the CPU 21 executes the set processing of the duty ratio of the first chopper transistor 20aa. When the interrupt signal is received from the timer 24a during the set processing of the duty ratio of the first chopper transistor 20aa at the time $t_8$ as shown in FIG. 5, the CPU 21 executes again the interrupt processing in the way described above.

It should be noted that although the time during which the on-and-off processing of the first and second chopper transistors 20aa, 20ba and pulsewidth of the interrupt signals are diagrammatically long as seen from FIG. 5, the on duration or off duration of the first and second chopper transistors 20aa, 20ba is substantially equal to the operation duration of each timer 24a, 24b.

Although in the above-described embodiment two timers 24a, 24b are used for simultaneous on-and-off processing of the respective chopper transistors, such two timers as described below may alternatively provided. That is to say, a first timer is used exclusively for turning off both of the first and second chopper transistors and second timer is used exclusively for turning on both of the first and second chopper transistors 20aa, 20ba. In addition, two interrupt processing programs are prepared. Under the construction described above, when the first timer has completed its operation duration, either of the first and second chopper transistors which is currently turned on is turned off and thereafter the second timer is set to operate during its operation duration. When the second timer has completed its operation duration, either of the first and second chopper transistor which is currently turned off is turned on and thereafter the first timer is set to operate during its operation duration. In this way, the two timers may be used by setting their operation durations alternatively to these timers. In this case, it is not necessary to determine whether the chopper circuitry (first and second chopper transistors 20aa, 20ba) is turned on or off.

It should be noted that the above-described processing routine shown in FIG. 3 and FIG. 5 is carried out in the case when both steering movement and vehicle speed change are needed, e.g., when the vehicle 3 is turned to either right or left in any given route of movement since both first and second motors need to be controlled in accordance with each duty ratio of the first and second chopper circuits set by the CPU 21.

Figure 6:
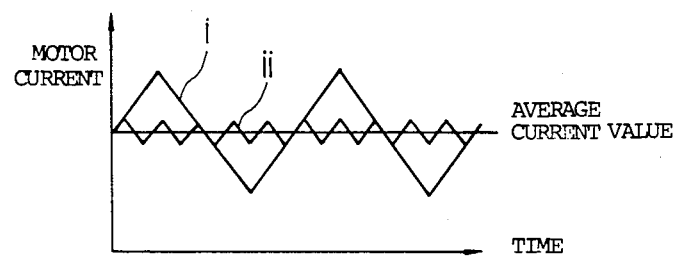
FIG. 6 is a graph showing the two types of current flow through a motor used to control either vehicle speed or steering movement.

FIG. 6 shows a change in a current flow through each motor $M_1$, $M_2$ with respect to time.

As shown in FIG. 6, the change rate of the current flow through each motor $M_1$, $M_2$ is larger as denoted by i in the case when the above-described on-and-off period is longer than in the case when the above-described on-and-off period is short as denoted by ii although an average current flow is the same. The length of the on-and-off period depends on the length of the main program. However, since the setting of the on-and-off period is carried out by the interrupt program according to the present invention, the on-and-off period can become shorter as denoted by i without influence on the length of the main program, i.e., without sacrifice of the normal control function of the vehicle speed and movement direction.

Figure 7:
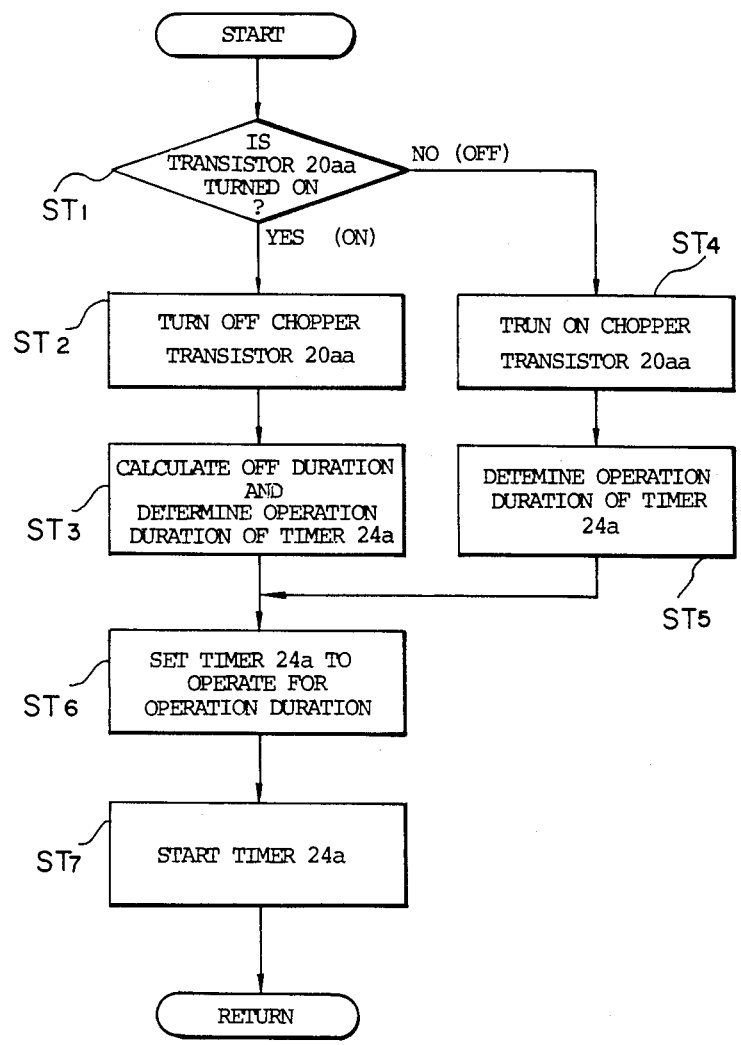
FIG. 7 is a flowchart of a modified interrupt program executed by the controller shown in FIG. 2.

FIG. 7 shows an interrupt program processing flowchart in a case when only the rotational control of the first motor $M_1$ is required, e.g., when the vehicle 3 is started or when the vehicle 3 is accelerated or decelerated along a straight guide wire 1.

When the CPU 21 receives the interrupt signal from the timer 24a, the CPU 21 executes the interrupt processing routine shown in FIG. 7. In a first step ST1, the CPU 21 determines whether the first chopper transistor 20aa is currently in the on state. If the CPU 21 determines that the first chopper transistor 20aa is in the on state (YES) in the step ST1, the CPU 21 issues the OFF command to the first chopper circuit to turn off the first chopper transistor 20aa. In the next step ST3, the CPU 21 calculates the off duration by the subtraction of the on duration calculated at the time of the normal main program routine from the predetermined on-and-off period and determines the calculated off duration as the operation duration of the timer 24a. If the CPU 21 determines that the first chopper transistor 20aa is currently turned off (NO) in the step ST1, the CPU 21 issues the ON command to turn on the first chopper transistor 20aa to the first chopper circuit 20a in the next step ST4 and determines the on duration calculated at the time of the normal main program routine as the operation of the timer 24a in a step ST5.

In a step ST6, the CPU 21 sets the timer 24a to operate for the determined operation duration in the previous step ST3 or ST5. In a final step ST7, the CPU 21 operates the timer 24a in accordance with the determined operation duration.

Figure 8:
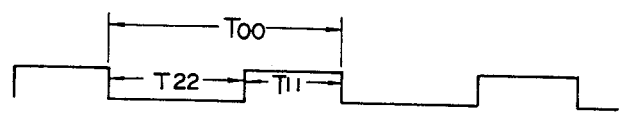
FIG. 8 is another example of timing chart of the CPU of the controller during processing of main program and interrupt program shown in FIGS. 3 and 7 respectively.

The operation of the CPU 21 in accordance with the interrupt program routine shown in FIG. 7 will be described below with reference to FIG. 8.

Suppose now that the CPU 21 sets the duty ratio of the first chopper transistor 20aa in accordance with the set processing of the duty ratio during the execution of the main program routine, sets the on duration of the first chopper transistor 20aa as $T_{11}$, and ends the above-described set processing of the duty ratio at the time $t_1$. Next, the time processing of the main program loop is executed and thereafter the normal control processing of the vehicle speed is started. When the time $t_2$ has been reached, the CPU 21 receives the interrupt signal from the timer 24a. At this time, the CPU 21 temporarily halts the above-described normal main control processing and executes the on-and-off processing of the first chopper transistor 20aa shown in FIG. 7. As shown in FIG. 8, since the first chopper transistor is in the on state, the CPU 21 issues the OFF command to the first chopper circuit 20a to turn off the first chopper transistor 20aa. Thereafter, the CPU 21 calculates the off duration $T_{22}$ by the subtraction of the on duration $T_{11}$ previously set by the CPU 21 from the predetermined on-and-off period $T_{00}$, determines the off duration $T_{22}$ as the operation duration of the timer 24a, and sets the timer 24a to operate for the operation duration. When the above-described on-and-off processing for the first chopper circuit 20a is ended at the time $t_3$, the temporarily halted main program control routine is restarted. When this main program control routine is ended, the set processing of the duty ratio of the first chopper transistors 20aa is started after the time processing of the main program loop. At the time $t_4$, since the timer 24a times up, i.e., the operation duration $T_{22}$ has reached, the timer 24a outputs the subsequent interrupt signal to the CPU 21, the set processing of the duty ratio is temporarily halted to start the on-and-off processing of the first chopper transistor 20aa. Since at this time the first chopper transistor 20aa is in the off state, the CPU 21 issues the ON command to the first chopper circuit 20a to turn on the first chopper transistor 20aa. Thereafter, the on duration set by the CPU 21 at the previous processing routine is determined as the operation duration of the timer 24a and the timer 24a is set to operate for the determined operation duration. The on duration $T_{11}$ set at the set processing before the end of the time $t_1$. Thereafter, the set processing temporarily halted is restarted wherein the on duration is newly set (updated). Thereafter, the operation duration of the timer 24a is determined on the basis of this newly set on duration until a new on duration is determined at the subsequent set processing. In this case, the on-and-off period of the first chopper transistor 20aa can become shorter so that the current carrying capacity of the first chopper transistor can be reduced.

The same interrupt processing can be prepared for the pair of the second chopper transistors 20ba of the second chopper circuit 20b.

As described hereinabove, in the system for controlling movement of unmanned vehicles and method therefor according to the present invention, the controller 6 mounted on each unmanned vehicle controls the vehicle speed and movement direction in accordance with the detected number of the markers provided on the ground along which each vehicle moves, such markers of simple construction may merely be installed on the ground and the system can be structured in the controller only by the preparation of any given program for route of movement between a starting point and final arrival point which corresponds to the detected number of markers. Therefore, accurate control of each vehicle for the movement thereof can be achieved without complexing the construction and increasing the cost of any equipment installed on the ground and controller installed on each vehicle. Furthermore, since each vehicle need not set the individual identification code, different controls of vehicle speed and movement direction for each vehicle can be achieved only by selecting the program area of the memory. Although the location of each marker is the same, the simultaneous control for a great number of unmanned vehicles can be achieved. In addition, when a new setting of route of movement and change in any route of movement are carried out, only the installation of new markers and change of the positions at which the original markers are located and the loading of a new set program and partial change of the overall program need be carried out.

It will clearly be understood by those skilled in the art that the foregoing description is made in terms of the preferred embodiments and various changes and modifications may be made without departing from the spirit and scope of the present invention, which is to be defined by the appended claims.

What is claimed is:

1. A system for automatically controlling movement of an unmanned vehicle, comprising:
   (a) first means having at least one curved corner defining at least one predetermined route from a starting point to a final destination of the vehicle so as to guide the vehicle to move therealong, the first means including (a) a guide wire extended on the ground along the predetermined route of movement, (b) a generator for generating an alternating current magnetic field around the guide wire, and (c) a detector installed on the vehicle for detecting the magnetic field around the guide wire and outputting a signal indicating the intensity of the magnetic field;
   (b) second means, disposed near the first means along the predetermined route, for indicating one of various movement control modes to be carried out by the vehicle, the second means including a plurality of markers, each marker located on at least one side of said guide wire adjacent to the curved corner and each marker generating a signal;
   (c) third means, installed on the vehicle, for detecting the presence of said second means as the vehicle moves; and
   (d) fourth means, installed on the vehicle and having predetermined data on the various control modes of movement of the vehicle to be carried out sequentially during movement of the vehicle along the predetermined route when said second means is detected by said third means for controlling the movement of the vehicle along the predetermined route, the fourth means controlling the movement of the vehicle in any one of the various control modes and controlling the movement direction of the vehicle according to the total detected number of said markers so as to move the vehicle along the guide wire in accordance with the signal from the detector.

2. The system according to claim 1, wherein said markers are located at both sides along said guide wire in equal numbers and at symmetrical positions across said guide wire adjacent to said curved corner.

3. The system according to claim 1, wherein said fourth means comprises fifth means for controlling the vehicle speed in accordance with a first duty ratio of a signal derived from a controller calculated from said predetermined data, sixth means for controlling the movement direction in accordance with a second duty ratio of another signal derived from the controller calculated from said predetermined data, and the controller having a memory in a predetermined memory area of which stores said predetermined data, for calculating said first and second duty ratios according to the predetermined data and sending a signal to each of said fifth and sixth means in accordance with the calculated duty ratio.

4. The system according to claim 3, wherein said fifth means comprises a first reversible motor linked with a drive wheel of the vehicle which drives said drive wheel to move in accordance with an average current flowing therethrough and a first chopper circuit having a first chopping transistor which supplies the average current for said first motor in accordance with said first duty ratio and said sixth means comprises a second reversible motor linked with a steering wheel of the vehicle which rotates said steering wheel to turn the movement direction in accordance with an average current flowing therethrough and a second chopper circuit having at least one second chopping transistor which supplies the average current for said second motor in accordance with said second duty ratio.

5. The system according to claim 4, wherein said controller executes an interrupt processing for determining an on-and-off period of each of said first and second chopping transistors and includes two timers each for the corresponding chopping transistor, the operation duration of which is dependent on the determined on-and-off period.

6. The system according to claim 1, wherein said second means comprises two markers one located at the starting point for generating a signal so that said fourth means controls movement of the vehicle such that the vehicle starts and is accelerated and the other located at the final arrival point for generating a signal so that said fourth means controls movement of the vehicle such that the vehicle is decelerated and stops at the final arrival point.

7. The system according to claim 1, wherein said second means comprises a plurality of markers each located at equal interval of distance along said guide wire and for generating a signal so that said fourth means controls movement of the vehicle according to the total detected number of said markers.

8. The system according to claim 1, wherein said second means comprises at least one marker which comprises a light emitting element and said third means comprises a light sensing element for receiving a light from said light emitting element and outputting an electrical signal indicative thereof.

9. A system for automatically controlling movement of an unmanned vehicle, comprising:
(a) a plurality of stations at which the vehicle starts or stops;
(b) guide means connected between each of said stations for guiding the vehicle to move therealong, said guide means having at least one branched corner located so that the vehicle turns in accordance with a predetermined route of movement from one of said stations at which the vehicle starts to one of said stations at which the vehicle stops;
(c) a plurality of markers installed aside said guide means for indicating any one of various control modes of movement of the vehicle to be carried out when the vehicle moves along the predetermined route of movement;
(d) a marker sensor installed on the vehicle for detecting the presence of said markers during movement of the vehicle; and
(e) a controller installed on the vehicle for storing predetermined data on the various control modes of movement of the vehicle to be carried out sequentially during movement of the vehicle along the predetermined route and for controlling movement of the vehicle in any one of the various control modes according to the total detected number of said markers.

10. The system according to claim 9, wherein one of said markers is located in front of said branched corner for indicating a control mode such that the vehicle speed is maintained at a constant speed.

11. The system according to claim 9, wherein two of said markers are located at both of said stations at which the vehicle is started and is stopped for indicating control modes such that the vehicle speed is increased and the vehicle is stopped, respectively.

12. The system according to claim 9, wherein three of said markers are located adjacent to said branched corner, a first one of said three markers being located in front of said branched corner for indicating one of the various control modes such that the vehicle is decelerated, a second one of said three markers being located in front of said branched corner followed by said first marker for indicating one of the various control modes such that the vehicle is turned at the branched corner, and a third one of said three markers being located at a position near the branched corner for indicating one of the various control modes such that the vehicle passed through the branched corner is accelerated.

13. The system according to claim 9, wherein said plurality of markers located at equal intervals to each other so that the vehicle controller controls movement of the vehicle according to the total detected number of said markers whenever the vehicle passes through each marker.

14. The system according to claim 9, wherein said controller comprises a microcomputer having the predetermined data and connected to said marker sensor, a first chopper circuit for controlling a current flow through a first motor whose driving torque determines a vehicle speed dependent upon a first duty ratio of a first predetermined period of a first on-and-off signal derived from said predetermined data and a second chopper circuit for controlling a current flow through a second motor whose driving torque and current flow direction determine a steering angle dependent upon a second duty ratio of a second predetermined period of a second on-and-off signal derived from said predetermined data.

15. The system according to claim 14, wherein said microcomputer includes a pair of timers and the predetermined data includes an interrupt program for determining either on duration or off duration of said first chopper circuit from said first duty ratio dependent upon the current conducting state of said first chopper circuit when a first timer outputs an interrupt signal.

16. The system according to claim 15, wherein said interrupt program determines either on duration or off duration of said second chopper circuit from said second duty ratio dependent upon the current conducting state of said second chopper circuit when a second timer outputs an interrupt signal.

17. The system according to claim 15, wherein said two timers are used, in such a way that one timer outputting the interrupt signal whenever the on duration of either first or second chopper circuit is ended and the other timer outputting the interrupt signal whenever the off duration of either first or second chopper circuit is ended.

18. A method for controlling movement of an unmanned vehicle, comprising the steps of:
(a) initializing at least a safety check and a self-diagnosis for a controller installed on the vehicle for controlling movement of the vehicle during movement of the vehicle in various control modes;
(b) storing predetermined data on the various control modes of movement of the vehicle to be carried out when the vehicle moves along a predetermined route of movement stored in a predetermined memory area;
(c) starting the vehicle and reading the predetermined data from the predetermined memory area;
(d) executing control of movement of the vehicle according to the read control mode sequentially read from a head address of the predetermined memory area;
(e) sensing markers placed along the predetermined route and executing the various control modes during movement of the vehicle along the predetermined route of movement based on the total number of said sensed markers; and
(f) repeating the above-described steps (d) and (e) until an end address of the predetermined memory area is read.

* * * * *